United States Patent [19]
Hurme et al.

[11] Patent Number: 5,898,697
[45] Date of Patent: Apr. 27, 1999

[54] ARRANGEMENT FOR DEFINING A TRANSMISSION DELAY IN A SUBSCRIBER NETWORK

[75] Inventors: Harri Hurme; Juha Heikkilä, both of Espoo, Finland

[73] Assignee: Nokia Telecommunications OY, Espoo, Finland

[21] Appl. No.: 08/564,187

[22] PCT Filed: Jun. 15, 1994

[86] PCT No.: PCT/FI94/00259

§ 371 Date: Mar. 8, 1996

§ 102(e) Date: Mar. 8, 1996

[87] PCT Pub. No.: WO95/01022

PCT Pub. Date: Jan. 5, 1995

[30] Foreign Application Priority Data

Jun. 18, 1993 [FI] Finland .................................. 932818

[51] Int. Cl.[6] ...................................................... H04J 3/06
[52] U.S. Cl. ............................................ 370/508; 455/502
[58] Field of Search .................................... 370/349, 508, 370/510, 512, 503, 516, 519; 455/63, 67.1, 502, 507, 503

[56] References Cited

U.S. PATENT DOCUMENTS

| | | | |
|---|---|---|---|
| 4,086,537 | 4/1978 | Asakawa et al. ........................ | 370/510 |
| 4,481,648 | 11/1984 | Fugii ..................................... | 370/510 |
| 4,519,068 | 5/1985 | Krebs et al. ............................ | 455/502 |
| 4,815,110 | 3/1989 | Benson et al. .......................... | 370/508 |
| 5,027,426 | 6/1991 | Chiocca et al. . | |
| 5,124,980 | 6/1992 | Maki . | |
| 5,228,030 | 7/1993 | Backstrom et al. . | |
| 5,229,996 | 7/1993 | Backstrom et al. . | |
| 5,258,981 | 11/1993 | Davey et al. ............................ | 370/311 |
| 5,317,571 | 5/1994 | Marcel et al. .......................... | 370/508 |
| 5,363,373 | 11/1994 | Nakahara et al. ....................... | 370/337 |
| 5,748,621 | 5/1998 | Masuda et al. .......................... | 370/337 |

FOREIGN PATENT DOCUMENTS

| | | |
|---|---|---|
| 0182601 | 5/1986 | European Pat. Off. . |
| 0268694 | 6/1988 | European Pat. Off. . |
| 0332818 | 9/1989 | European Pat. Off. . |
| 0376527 | 9/1992 | European Pat. Off. . |
| 3421527 | 12/1985 | Germany . |
| 3500363 | 7/1986 | Germany . |
| 4107640 | 9/1992 | Germany . |
| 92/01341 | 1/1992 | WIPO . |
| 95/01022 | 5/1995 | WIPO . |

*Primary Examiner*—Ajit Patel
*Assistant Examiner*—Chiho Andrew Lee
*Attorney, Agent, or Firm*—Pillsbury Madison & Sutro LLP

[57] ABSTRACT

An arrangement for determining transmission delay in a subscriber network which has a plurality of subscriber sets, a plurality of subscriber terminals (to one subscriber terminals to one subscriber terminal being connected at least one subscriber set by a transmission connection implemented in an electrical form), and a central unit, which is common to the several subscriber terminals and connects the subscriber sets to a public switched telephone network. In the subscriber network, time-division data transmission between the several subscriber terminals and the central unit occurs along a common transmission path. A value representing the transmission delay between the central unit and an individual subscriber terminal is determined, whereby a transmission of a subscriber terminal towards the central unit is synchronized in he subscriber terminal with the frame structure of a signal to be transmitted from the central unit towards the subscriber terminal. To enable performing the determination quickly by using simple equipment and by utilizing the transmission capacity efficiently, there is a specific message transmission time slot in the transmission frame for a transmission from the subscriber terminals towards the central unit, whereby determination of the value representing the transmission delay is performed in the central unit from a message transmitted by the subscriber terminal in the message transmission time slot, by measuring the location of the received message in relation to the frame structure of the signal to be transmitted from the central unit towards the subscriber terminal.

19 Claims, 5 Drawing Sheets

ARRANGEMENT FOR DEFINING A TRANSMISSION DELAY IN A SUBSCRIBER NETWORK

This application claims benefit of international application PCT/FI94/00259 filed Jun. 15, 1994.

BACKGROUND OF THE INVENTION

The invention relates to an arrangement for determining a transmission delay in a subscriber network.

The solution according to the invention is especially suitable for a measurement of timings of uplink messages (from a subscriber towards a central unit) of a point-to-multipoint network implemented by time-division technique. Such networks can be, for instance, combined cable television and telephone networks, so-called Passive Optical Networks (PONs) and wireless local loops.

In known subscriber networks based on the time-division technique, no subscriber-terminal-specific measurement of transmission delay is needed, for the connections are point-to-point connections. When the time-division technique is used in combined cable television and telephone networks or PONs, it is necessary to have a transmission delay for each subscriber terminal under control, because of the multipoint character of the connections. This means that a procedure of some kind has to be arranged in such a network for measuring the subscriber-specific transmission delay so that the subscriber terminals are able to learn the correct moments of transmission.

One known method of measuring a transmission delay is based on the looping of the signal to be transmitted outside an actual transmission channel. In these arrangements, the delay is measured by monitoring an own message, which is looped back from the other end of the connection. The transmission takes place outside the actual transmission channel, on a channel especially allocated for delay measurement. The looping can be made at the midpoint of the point-to-multipoint network, in which case a subscriber terminal measures the delay, or the subscriber terminal can be connected to form a loop, in which case a device at the midpoint of the network measures the loop delay.

Another known method of measuring a loop delay is a measurement to be performed on the actual transmission channel. Then, to a payload signal is added a low-level slow-changing message of DS-spread-spectrumsignal type (DS, standing for direct sequence), which message can be detected on the reception side by means of a specific correlation receiver. A low-level signal does not interfere a data transmission on the same channel, but allows a determination of the loop delay anyway.

Drawbacks of the known measuring methods are, e.g., separate device arrangements required, which make the equipment more complicated than before, and also the transmission capacity needed, which makes the bandwidth left for actual utility purposes smaller. A further drawback of the measurements to be performed outside the actual transmission channel is that the delay may vary in different frequency ranges.

SUMMARY OF THE INVENTION

The object of the present invention is to provide a novel solution for the measurement of a delay, not showing the above-mentioned drawbacks. This is achieved by means of the arrangement according to the invention, which is characterized in.

The idea of the invention is to determine a value representing a delay of a subscriber terminal in a central unit of a subscriber network on the basis of the location (measured with respect to frame structure) of a message burst sent by the subscriber terminal to a common message channel. It shall be noted that the value representing transmission delay is of interest in this connection, because the absolute value of the delay need not be determined, and cannot be determined either, because of different processing and other delays (the exact value of which is not known) relating to a loop delay.

By means of the solution according to the invention, a simple and quick method is achieved, which is also capable of utilizing the transmission capacity efficiently.

Since a transmission delay can be measured, by using the method of the invention, without any specific arrangements from a normal signalling message or the like required by telephone traffic, the equipment can be maintained as simple as possible. A delay measurement may be performed entirely in the central unit, in which case there is no need to add any electronics whatsoever to parts critical as for expenses, i.e. to subscriber terminals, for the measurement of the delay. The measurement of a transmission delay also occurs very quickly compared, e.g., with those known methods in which the central unit or a subscriber terminal is switched to reflect back a received signal for the measurement of the delay. An adjustment of a delay is an iterative process, but one adjustment round is usually enough in normal operation.

Since a delay measurement is performed, when using the method of the invention, from the messages of a signalling channel, no such transmission capacity has to be allocated for the delay measurement which is unused for most of the time in a normal situation, as happens in connection with a looping on a separate channel. The value of the delay cannot change either, because the measurement is made from a burst to be transmitted in a time slot allocated for utility purposes.

The method according to the invention also allows an accurate delay measurement by one single method, by iterating if necessary, unlike some known delay measuring methods requiring separate functions for a determination of a rough and an exact value.

According to one preferred embodiment of the invention, a determination is always performed from an initial message for establishing a connection, which message informs of an offhook state of a subscriber terminal. So, no separate delay measuring message is needed and an implementation as simple as possible is provided.

BRIEF DESCRIPTION OF THE DRAWINGS

Below, the invention and its preferred embodiments will be described in greater detail with reference to the examples of the attached drawings, in which.

DETAILED DESCRIPTION

Figure 1:
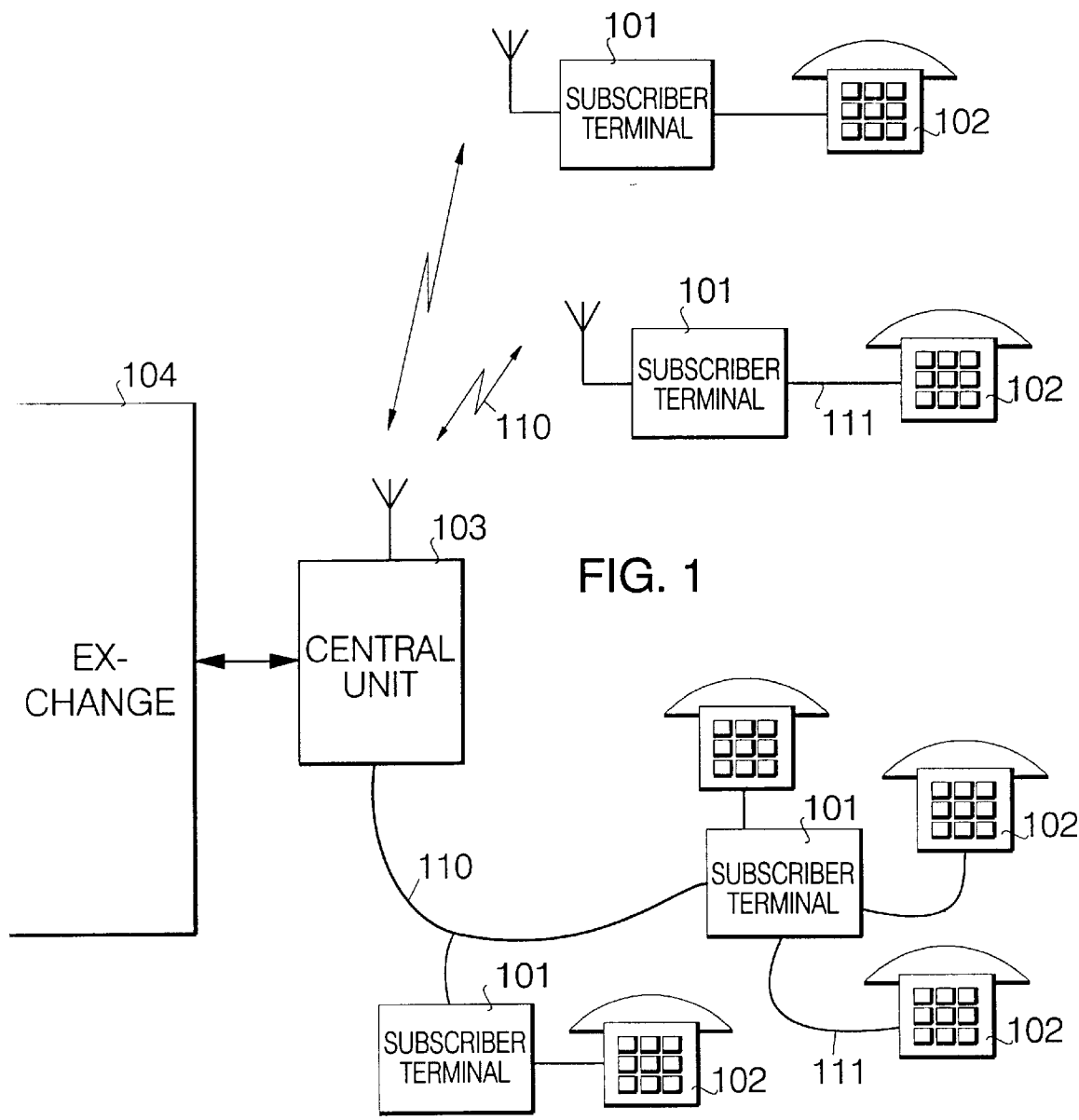
FIG. 1 illustrates a subscriber network, constituting a typical environment for an application of the invention.

FIG. 1 shows a subscriber network implemented by means of a time-division multipoint access. The network comprises several subscriber terminals 101, each of them being connected to a telephone set of one or several subscribers or to another similar telecommunication terminal 102, and a central unit 103 common to all subscriber terminals. The central unit is a device establishing a multipoint connection and connecting the subscribers to an exchange 104 of a Public Switched Telephone Network (PSTN). As interface is used one of the standardized digital interface methods, such as V2 or V5.1 or V5.2, which (last-mentioned) also makes a concentration possible (more subscribers than time slots).

The subscriber terminals 101 may be devices positioned at a subscriber, or a subscriber terminal may be a subscriber multiplexer known per se, such as the ACM2 subscriber multiplexer of Nokia, to which are added e.g. a modem establishing an RF connection and framing circuits required for forming a transmission frame to be sent from a subscriber towards the exchange.

A transmission channel 110 between the subscriber terminal and the central unit may be a radio channel, e.g. a coaxial cable of a cable television network or even a Passive Optical Network (PON). Combinations of these may also be used in such a way that physical transmission media forming a transmission path are different in different transmission directions. This is an advantageous manner of working, e.g. in cases when a fixed one-way distribution network already exists, whereby uplink direction may be implemented by radio, for instance.

A copper cable 111 extending from a subscriber terminal to a subscriber set 102 is very short in practice, maximally perhaps about 100 m.

Networks similar to those described above are also set forth in the Finnish Patent Application 932818, to which is referred for a more detailed description. This application describes, e.g., the structure of the central unit 103 and a subscriber terminal 101 in greater detail.

Figures 2A, 2B:
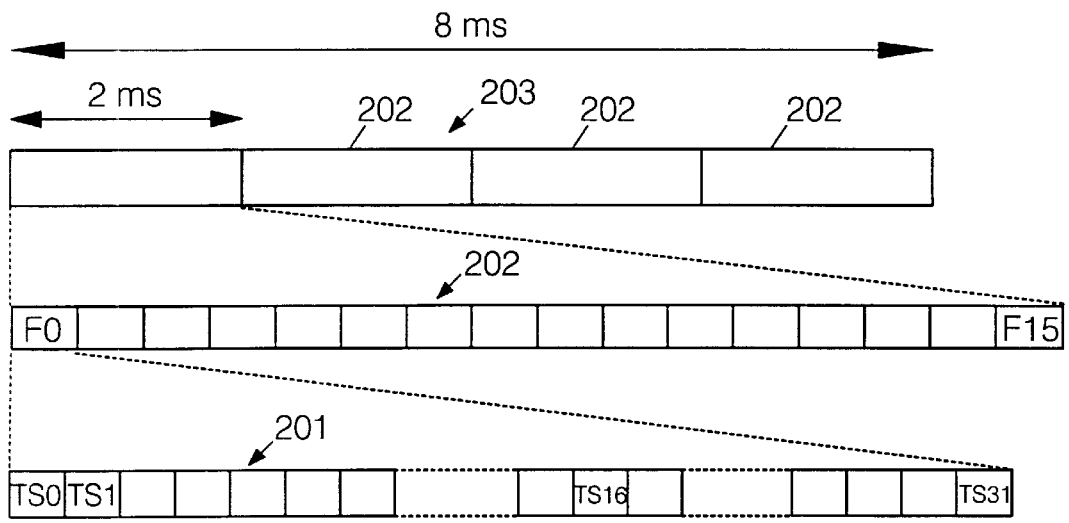
FIG. 2a shows a frame structure to be used for downlink connections in the network according to FIG. 1 in more detail.
FIG. 2b shows bits to be transmitted in time slots TS0 of consecutive frames of one multiframe for downlink connections.

A downlink connection, i.e. a connection from the central unit to a subscriber terminal, can be implemented in a network as described above by modifying a standard 2048 kbit/s frame structure as little as possible, but still in such a way that from the multiplexing system known per se, in the frame structure of which separate signalling bits are allocated for each subscriber, is changed over to the use of message-based signalling. The changes relate to the structure of time slot zero (TS0), and time slot 16 (TS16) is freed from signalling for some other purpose. FIGS. 2a and 2b show the downlink frame structure in such a way that FIG. 2a illustrates the actual frame structure and FIG. 2b illustrates the signalling to be transmitted in time slot zero (TS0). Reference numeral 201 indicates a frame of the 2048 kbit/s basic multiplexing system known per se, which frame is divided into 32 time slots TS0 . . . TS31, the time slots TS1 . . . TS15 and TS17 . . . TS31 constituting speech channels in a known manner. In the system, sixteen successive frames F0 . . . F15 constitute a multiframe 202, which is 2 ms long. Multiframes of the sixteen frames may further constitute a superframe 203, the length of which is, e.g., four multiframes and the duration 8 ms, accordingly.

To time slot zero (TS0) is added a message-based signalling channel consisting of free bits of odd frames, as shown in FIG. 2b. In time slot zero, the bits indicated by reference mark S are bits of a signalling message, the bits indicated by reference mark KL are frame alignment bits, the bits indicated by reference mark C are CRC4-bits, by means of which the quality of the connection is monitored, the bits indicated by reference mark SF inform the number of the multiframe, and the bits indicated by reference mark X are stuffing bits of no significance. Bits b1 of the odd frames, circled in FIG. 2b, constitute a multiframe alignment word according to the CCITT Recommendations. Subsequent bits (b2), set as ones, inform that the frame in question has no frame alignment word.

40 bit messages (5 bits in a frame, 8 frames in a multiframe) are formed of the signalling bits S. Since from the bits to be transmitted in time slot zero, only the frame alignment bits KL and the bits b1 of the odd frames, as well as possibly the SF bits are associated with delay measurement, the use of the other bits is not described in more detail, but with respect to them, reference is made to the above-mentioned Finnish Patent Application 932818. Synchronization data of a multiframe is transmitted by means of the frame alignment bits KL, i.e. a 2 ms sync is generated, by means of which an uplink connection is synchronized. On the other hand, possible synchronization data of a superframe is transmitted by the SF bits. These bits make it possible to form a superframe, the length of which is a multiple of 2 ms. This may be necessary, because the uplink connection is synchronized by means of a time signal received from downlink multiframe synchronization, and for uplink connection, it may in some cases be necessary to use a multiframe structure of more than 2 ms. Though FIG. 2a shows the length of a superframe to be four multiframes (which is the maximum number informable by two bits, if the ordinal number changes in each frame), the superframe may be even longer, e.g. eight multiframes, in such a way that every eighth multiframe has a value determined by the SF bits, e.g. 11.

Figure 3:
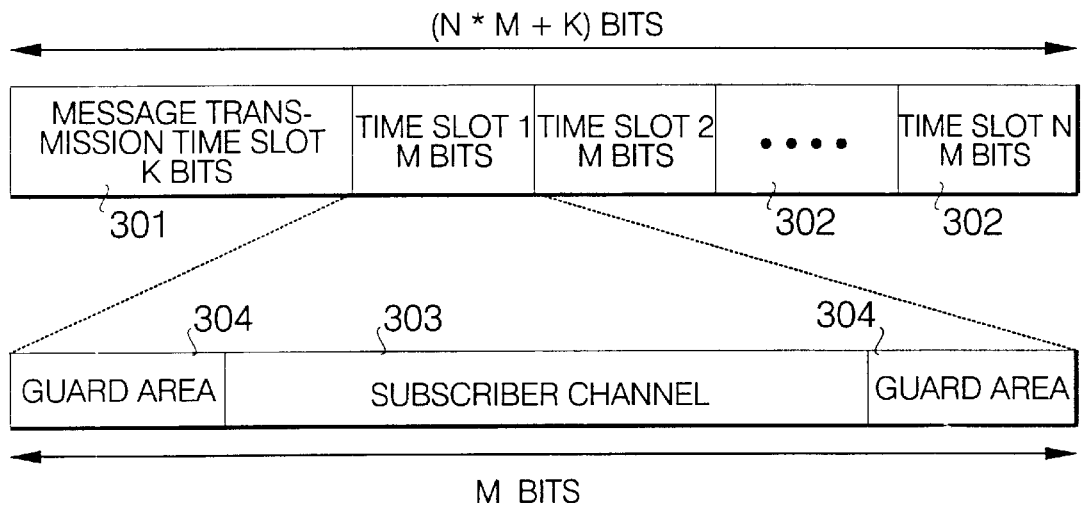
FIG. 3 shows a frame structure to be used for uplink connections in the network of FIG. 1.

An uplink connection preferably is established in the network according to FIG. 1 by using the frame structure shown in FIG. 3. A frame consists of one long message transmission time slot 301 and several shorter time slots 302 allocated for the subscribers to transmit data (speech or data transmission) (i.e. typically K>>M). Each time slot allocated for data transmission comprises an actual subscriber channel 303, at both ends of which there is a guard area 304 of a few bits. Advantages offered by such a frame structure in the network according to FIG. 1 are described in greater detail in the above-mentioned Finnish Patent Application.

One subscriber terminal (which may contain more than one subscriber) at a time uses the message transmission time slot 301. A message burst to be transmitted in the message transmission time slot thus comprises an identifier of the transmitting subscriber terminal. If a collision occurs between two subscriber terminals, retransmission times are allotted, i.e. after how many frames a retransmission is performed. Message transmission may utilize e.g. the Slotted Aloha protocol known per se, described in greater detail e.g. in reference [1] (identified in the list of references provided at the end of DETAILED DESCRIPTION). Accordingly, the message transmission time slot preferably is common to all subscriber terminals and all message types required are sent therein, e.g. call setup and disconnect messages, network management messages and different acknowledgement messages. For the determination of a delay, however, it is not essential how many messages of different types are sent in the message transmission time slot.

For a practical implementation of the equipment, it is preferable to select as an uplink bit rate the same rate which is used in downlink direction, i.e. 2048 kbit/s, for instance. Then it is simpler to generate, e.g., the clock signals required. By making the following selections, for instance:

number of data transmission time slots N=54,
length of data transmission time slots M=72 bits, and
length of the message transmission time slot K=208 bits,
4096 bits in total are obtained for an uplink frame, whereby the duration of the frame is (at a bit rate of 2048 kbit/s) 2 ms, which corresponds to the time required for a transmission of a downlink multiframe.

In the present invention, the relative distance between the midpoint of the network (central unit) and a terminal positioned at a subscriber (subscriber terminal) is measured by means of messages sent by the subscriber terminal in the message transmission time slot 301. The measurement can be performed with an accuracy of a fraction of a bit (facts affecting the accuracy will be described in more detail below). The subscriber terminal 101 sends the normal signalling messages relating to a call establishment to the message transmission channel, which is common to all subscriber terminals and consists of message transmission time slots 301. When receiving the messages at the midpoint of the network, the central unit 103 measures the initial moment of the message in relation to the multiframe alignment of the frame structure sent by the central unit to the subscriber terminals in the downlink direction. The subscriber terminal tends to send a message always at a certain moment in relation to the uplink frame alignment, whereby the relative distance between the subscriber terminal and the central unit can be determined by measuring at the midpoint of the network the deviation of the transmission from the transmission moment intended. For timing the transmission moment, the subscriber terminal uses as reference the downlink synchronization and the information of time difference stored in its own memory, the information representing the transmission postponement of an individual subscriber terminal. According to a very preferred embodiment of the invention, the value of this transmission postponement is updated to be correct on the basis of the determination of the value representing the transmission delay.

Figure 4:
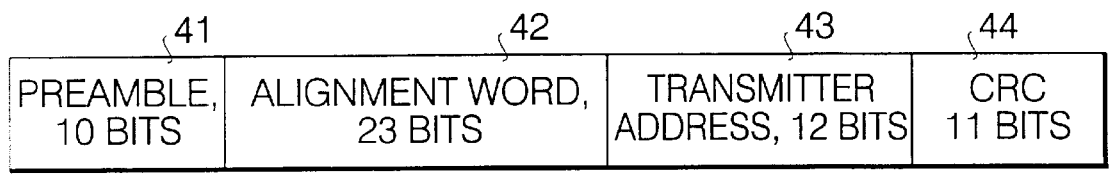
FIG. 4 shows the structure of a message burst to be used for establishing a connection.
Figure 5:
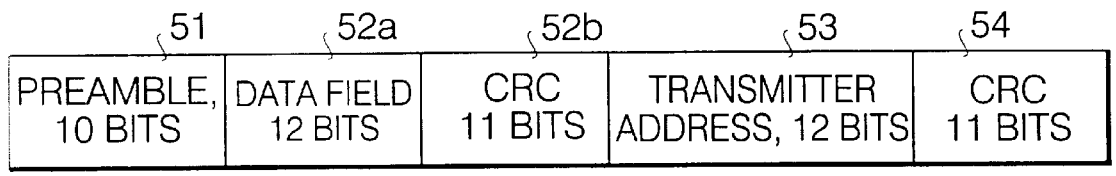
FIG. 5 shows the structure of a message burst to be used for a transmission of an actual signalling message or the like, FIG. 6 illustrates an equipment used for a delay measurement.

FIGS. 4 and 5 illustrate the structure of a message burst to be transmitted in the message transmission time slot 301. FIG. 4 shows a burst to be used for an establishment of a connection, and FIG. 5 shows a burst to be used for a transmission of an actual signalling message or the like. The total length of both burst types is 56 bits, and, at the beginning of each burst, there is a 10 bit preamble section 41 and 51, respectively, acting as a guard area. The burst of FIG. 4 is an initial message for establishing a connection, which message, according to a preferred embodiment of the invention, simultaneously corresponds to normal detection of an offhook state. For this reason, no actual data field is required for this message, as for the message of FIG. 5, but in place of a 12 bit data field 52a and a subsequent 11 bit CRC section 52b, it has been possible to arrange a fixed bit pattern 42 of 23 bits, i.e. an alignment word, by means of which the correlator of the receiver is capable of finding the burst in the message transmission time slot 301 common to all subscribers. A section 43 and 53, respectively, (in length of 12 bits) informing the address of the transmitter and a CRC word 44 and 54, respectively, (in length of 11 bits) required for checking the correctness of the address, are similar in both burst types.

When establishing a connection, the transmission postponement of a subscriber terminal is immediately adjusted correct, by repeating the message according to FIG. 4, if necessary. Subsequently, no fixed bit pattern 42 is needed any more in the transmitted messages, because the message burst always hits the same predetermined point of the time slot. Consequently, actual payload data of the message, meaning the data field 52a and the associated checking section 52b, can be positioned in place of the fixed bit pattern, as is made in the message according to FIG. 5. By using the alignment word at the establishing stage of the connection only, the actual message can be made as short as possible, whereby the difference between the maximum delays of the subscriber terminals may be greater (the burst fits better into the message transmission time slot). After the determination of the delay, the length of the message burst may also be increased, even to such an extent that the length corresponds to the length of the whole message transmission time slot, excluding short guard areas of a few bits.

For the CRC of a burst, it is preferable to use a Golay 23,12 code known per se, for its excellent error detection characteristics. Such a code is described e.g. in reference [2] (in the list of references provided at the end of this DETAILED DESCRIPTION). If required, three erroneous bits can be corrected in a 12 bit message received by means of this code. The same checking code is used both for the data field and for the subscriber address, due to which the message check can be made in a serial form in one single CRC section only.

Figure 6:
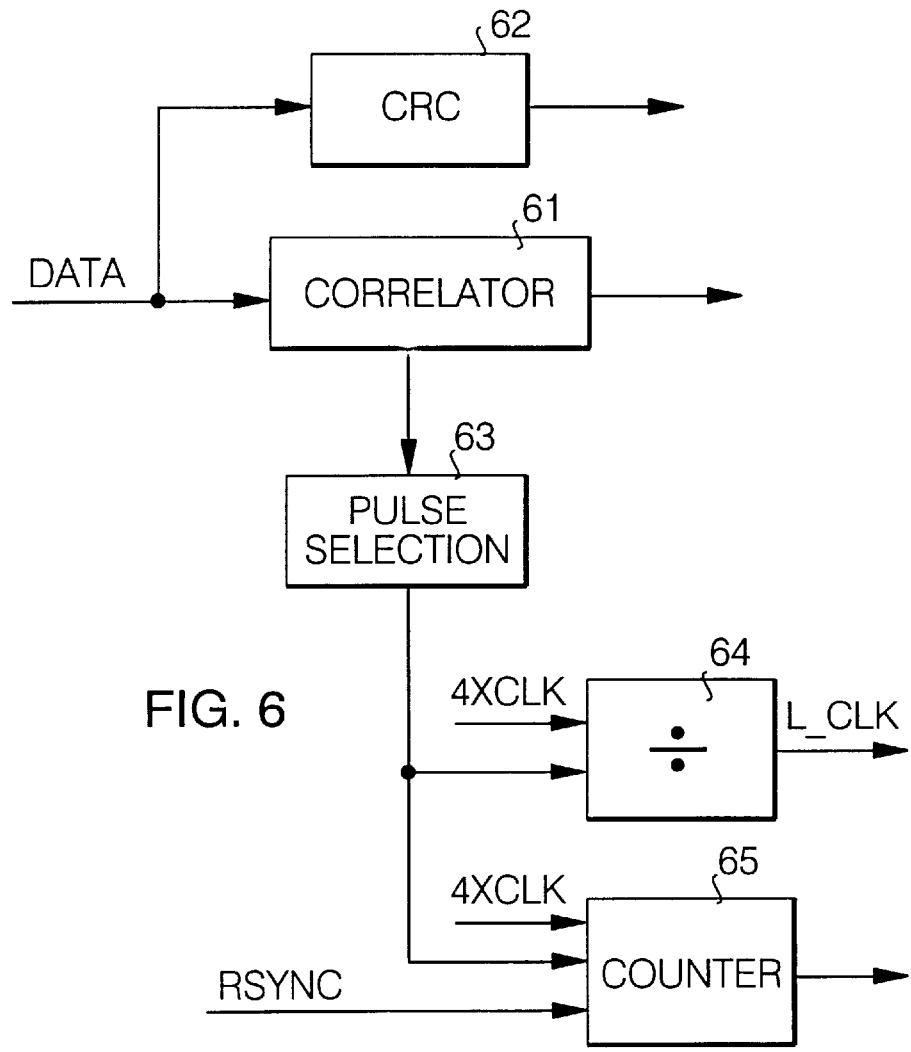

FIG. 6 illustrates means performing delay measurement in the central unit 103 in greater detail. The device comprises a correlator 61, to the input of which a DATA signal received from a subscriber terminal is connected and from a first output of which is received the same signal delayed. A second output of the correlator is connected to a pulse selector 63, an output signal of which is connected both to a reset input of a frequency divider 64 and to a stopping input of a counter 65. To the actual inputs of both the frequency divider and the counter is connected a clock signal 4×CLK, the frequency of which is thus in this example case quadruple compared to the bit clock of the data to be transmitted. To a starting input of the counter 65 is connected a starting pulse RSYNC generated on the basis of a frame to be transmitted in downlink direction when the message transmission time slot should begin in the frame structure to be received in uplink direction.

An incoming data stream is connected also to a CRC unit 62, from the output of which the result of the checking is obtained.

Figure 7:
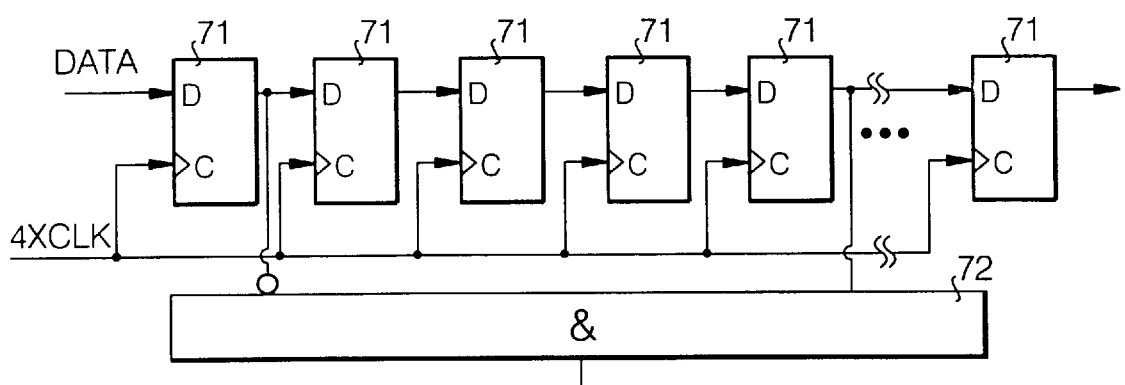
FIG. 7 illustrates a correlator used in the equipment of FIG. 6.

According to FIG. 7, the correlator 61 is constituted by 92 (4*23) successive D flip-flops 71, the state of which is 1 or 0, depending on sample value. Samples are read from the incoming bit stream at a quadruple clock frequency into the correlator. The output of every fourth D flip-flop is connected to be an input of an AND gate 72, due to which the AND gate has 23 inputs. The output connected to the AND gate is inverted, if the alignment word has 0 at the corresponding point, otherwise the output of the D flip-flop is directly connected to be the input of the AND gate. The AND gate connected in this way gives a one at its output only when a received bit sequence corresponds to the alignment word 42. Such a correlator can generate also several pulses at the arrival of the alignment word, depending on whether the sampling moment has succeeded (the optimum is 1 pulse, however). By studying the number of pulses, the initial moment of a signalling hurst can be determined with an accuracy of a fraction of one bit. For instance, if the correlator gives three pulses, the midmost pulse can be assumed to be the best sampling moment and determined as the reception moment of the burst. Generally speaking, it can be stated that, in case of several pulses, the moment in the middle of the first and last pulse indicates the reception moment which is closest to the correct one.

Accordingly, the pulse selector 63 may be implemented in many ways depending on whether it is desirable to count the number of the received pulses and to correct the result of the determination in this way. A pulse selector is not absolutely necessary either, if, e.g., the accuracy is accepted which is obtained always from the first pulse generated by the correlator.

A value representing a loop delay between the central unit 103 and an individual subscriber terminal can be measured when the exact initial moment of a message burst in relation to the beginning of the message transmission time slot in the frame structure of an uplink connection is known. The measurement of the delay is performed by means of a counter 65 operating at quadruple clock frequency. The counter is started by means of an RSYNC pulse at a moment when the message transmission time slot of the uplink frame structure begins. The counter is stopped by means of a pulse generated by the above-described correlator, which pulse is "selected" by the selector 63 (if a selector is used). The loop delay can be found out by examining the reading of the counter after the stop. The accuracy can be increased by considering the additional information (to be described further below) to be received from the number of the pulses generated by the correlator.

Figure 8:
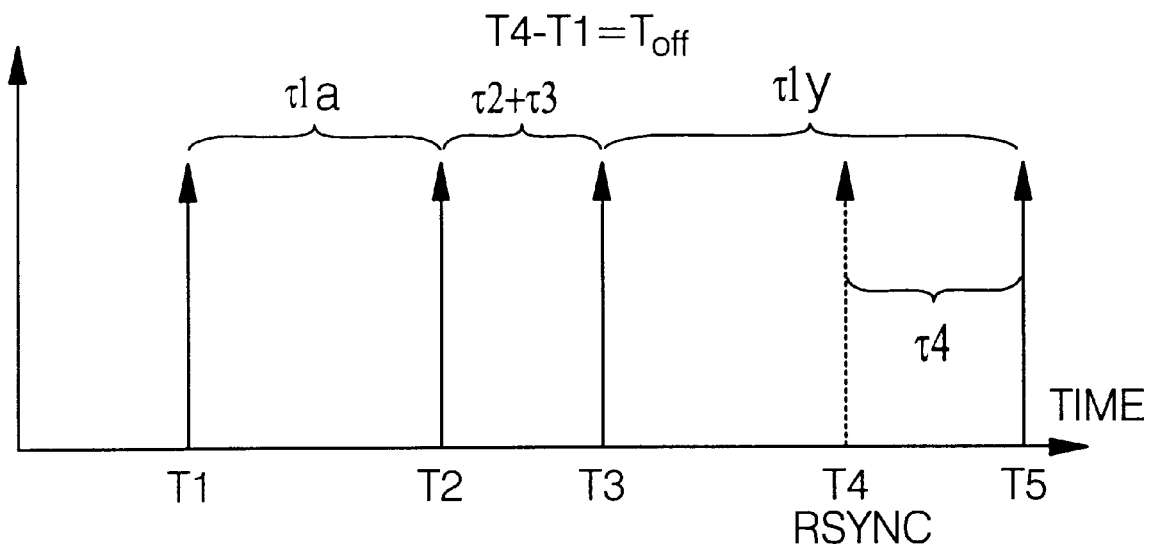
FIG. 8 illustrates a formation of different delay components.

FIG. 8 illustrates the measurement of a loop delay by presenting on a time axis the moments significant with respect to the delay measurement. At a moment T1, the central unit 103 begins to transmit a downlink multiframe, which means that the moment T1 corresponds to the beginning of frame F0. After a path delay τ1a, at a moment T2, a subscriber terminal receives the beginning of the multiframe and is aligned to the multiframe structure. The subscriber terminal uses the initial moment of the downlink multiframe it has received as a reference time signal of its own transmission in the uplink direction. The subscriber terminal discovers this reference time signal by aligning to the frame alignment bits KL it has received (cf. FIG. 2b), by searching on the basis of these for a multiframe alignment word (bits b1 in odd frames) and by calculating the initial moment of the multiframe on the basis of these data.

Then the subscriber terminal starts transmitting an uplink frame at a moment T3 delayed by the total of a predetermined processing delay τ2 and an adjustable subscriber-terminal-specific transmission postponement τ3 with respect to the moment T2 of the reference time signal. The transmission postponement τ3 has an initial value set at the installation of the subscriber terminal and stored in the memory of the subscriber terminal. The message of the subscriber terminal arrives at the central unit at a moment T5. The path delay between the moments T5 and T3 does not need to be identical to the difference between the moments T2 and T1 (the difference being a downlink delay τ1a). A moment T4 indicated in the figure (i.e., the starting moment of the counter) is the moment when the central unit 103 starts receiving the uplink frame (i.e., the moment considered by the central unit as the starting moment of the message transmission time slot). The difference between the starting moments of the downlink and uplink frame is $T_{off}$, by means of which the effect of a transmission delay component common to the subscriber terminals can be taken into account. The value of the magnitude $T_{off}$ may also be zero, in which case T4=T1. A pulse from the correlator 61 is obtained at the moment T5. The reading of the above-described counter 65 informs the difference between the moments T5 and T4, indicated by reference mark τ4. By means of this information, an equation (1) can be formed, from which the loop delay can be calculated;

$$T_{off}+\tau 4=2\times\tau 1+\tau 2+\tau 3 \tag{1}$$

In the equation (1), $T_{off}$ and τ3 are known set values and τ2 a constant common to all subscriber terminals, which constant represents the processing delay and can be considered as part of the loop delay. Then the value 2×τ1 of the loop delay can be calculated unambiguously.

In practice, it is not necessary to calculate the value of the delay, but the exchange unit tries to obtain some predetermined time as the value of $T_{off}+\tau 4$. This takes place by changing the adjustable transmission postponement τ3 of the subscriber terminal on the basis of the measurement results of τ4; the exchange unit informs the subscriber terminal of a new postponement value τ3 or a correction time, which is added to the postponement value τ3 already existing in the memory of the subscriber terminal.

After the transmission postponement has been made correct, the transmission of the subscriber terminal occurs accurately at the right place in the time slot and a transmission of payload data may begin. An advantage of iterative adjustment is that the uplink and downlink delays, τ1a and τ1y, do not need to be equal.

By selecting a quadruple clock frequency for the correlator and the counter, an accuracy corresponding to a quarter of a bit can be achieved in an optimum situation of the measurement (1 pulse from the correlator). If several pulses are received from the correlator, the accuracy is worse, but by taking into account the additional information received from the number of the pulses generated by the correlator, the accuracy may be set to correspond to the optimum situation, in which originally only one pulse would have been received.

The exact initial moment of a burst transmitted in the message transmission time slot can be utilized, besides for delay measurement, also for the reception of the other bits of the burst. This takes place by generating in the frequency divider 64 a local bit clock L_CLK, which is synchronized with the bit clock of the transmitting subscriber terminal. According to FIG. 6, the clock can be generated successfully by applying the quadruple bit clock 4×CLK of the correlator to the frequency divider 64 and by resetting the divider by means of a pulse generated by the correlator. By means of a local clock signal generated in this way, the remaining bits of the message burst can be read into the memory to wait for the result of a CRC comparison. An advantage of such a procedure is that as memory can be used a 92 bit shift register of the correlator, the clock signal of which register is changed for the locally generated bit clock immediately after the alignment word has been received.

Though the invention has above been described referring to the examples according to the attached drawings, it is clear that the invention is not restricted to them, but it can be modified within the scope of the inventive idea set forth above and in the attached claims. For instance, the reference time signal used by the subscriber terminal can be any moment of the frame. Thus, essential are not the absolute locations of the individual moments, but essential is that they are tied to each other in such a way that the value representing the delay can be measured in the manner described above. So, the significant moments may have certain offset values with respect to each other, if only the magnitudes of these offsets are known. For instance, the counter measuring the delay can be started at any stage, provided that the starting moment is known, of course. The network can also be provided with changes that are not associated with the idea of the invention; for example, it is possible to integrate a subscriber set and a subscriber terminal into the same casing. In this sense, the mentioning of separate subscriber sets and terminals shall be understood more widely.

List of references

[1]. Tanenbaum, A. S.: Computer Networks, Englewood Cliffs 1989, Prentice Hall Inc.

[2]. John G. Proakis: Digital Communications, Second Edition, McGraw-Hill Book Company, 1989.

We claim:

1. An arrangement for determining transmission delays in a subscriber network, comprising:
    a plurality of subscriber sets;
    a plurality of subscriber terminals;
    each said subscriber terminal being connected to at least one said subscriber set by a respective transmission connection;
    a central unit which is common to all of said subscriber terminals and connects said subscriber sets to a public switched telephone network;
    said subscriber network being arranged such that time-division data transmissions, when made between said subscriber terminals and said central unit, occur along a common transmission path;
    said subscriber network being arranged for determining a respective value representing a respective transmission delay between said central unit and each respective said subscriber terminal;
    said subscriber network being arranged such that transmissions from respective ones of said subscriber terminals towards said central unit are synchronized in the respective subscriber terminals, with a frame structure of a respective signal to be transmitted from said central unit towards the respective subscriber terminal;
    said subscriber network being arranged such that for determining each respective said transmission delay, a respective message is sent only from the respective subscriber terminal towards said central unit, in a respective message transmission time slot having a predetermined position in a transmission frame in a corresponding transmission direction; and
    said central unit is arranged to perform a determination of the respective value representing the respective transmission delay, from a respective said message sent by the respective subscriber terminal in a respective said message transmission time slot, by measuring the location of a respective received message in relation to said frame structure of the respective said signal transmitted from said central unit towards the respective said subscriber terminal.

2. The arrangement according to claim 1, wherein:
    said central unit is arranged to adjust transmission postponement of respective individual ones of said subscriber terminals by means of the respective said value representing the respective said transmission delay.

3. The arrangement according to claim 2, wherein:
    said central unit is arranged always to perform a respective said determination from a respective initial message for establishing a respective connection, the respective said initial message informing of an offhook state of a respective said subscriber terminal.

4. The arrangement according to claim 3, wherein:
    each said subscriber terminal is arranged to repeat the respective said initial message.

5. The arrangement according to claim 2, wherein:
    said central unit includes a correlator arranged for a respective alignment word including in each said initial message in determining the respective said value representing the respective said transmission delay.

6. The arrangement according to claim 5, wherein:
    said subscriber network is arranged to provide a respective said alignment word only in a respective said message to be transmitted at a starting stage of a respective said transmission connection.

7. The arrangement, according to claim 6, wherein:
    said subscriber network is arranged to replace the respective said alignment word in respective messages following respective said starting stage messages, by a respective said data field section, immediately after a respective transmission postponement of a respective said subscriber terminal has been adjusted by said central unit.

8. The arrangement according to claim 7, wherein:
    said central unit is arranged to adjust each said transmission postponement by iterating.

9. A method for determining transmission delays in a subscriber network which has a plurality of subscriber sets, a plurality of subscriber terminals, each subscriber terminal being connected to at least one said subscriber set by means of a respective transmission connection, and a central unit, which is common to all of aid subscriber terminals and connects said subscriber sets to a public switched telephone network, said method comprising the steps of:
    establishing a time-division data transmission between said subscriber terminals and the central unit along a common transmission path;
    determining for each of said subscriber terminals a respective value representing a respective transmission delay between the central unit and each respective subscriber terminal;
    synchronizing transmission of each respective subscriber terminal towards the central unit, in the respective subscriber terminal, with a frame structure of a signal to be transmitted from the central unit towards each subscriber terminal;
    sending a respective message only from each respective subscriber terminal towards the central unit in determining the respective transmission delay;
    each said subscriber terminal sending the respective said message in a respective message transmission time slot having a predetermined position in a transmission frame in a corresponding transmission direction; and
    performing a determination of each respective value representing each respective transmission delay in the central unit, from a respective message sent by each respective subscriber terminal in the respective said message transmission time slot by measuring the location of the respective said message as received by the central unit, in relation to the frame structure of the respective signal to be transmitted from the central unit towards the respective said subscriber terminal.

10. The method according to claim 9, further comprising:

the central unit adjusting transmission postponement of each said subscriber terminal based on the respective said value.

11. The method according to claim 10, comprising:

always performing said determining from a respective initial said message made for establishing a respective said connection, each said initial message being one informing of an offhook state of a respective said subscriber terminal.

12. The method according to claim 11, further comprising:

each said subscriber terminal repeating the respective said initial message.

13. The method according to claim 10, further comprising:

using a correlator detecting a respective alignment word including in the respective said message for determining the respective said value.

14. The method according to claim 13, further comprising:

using the respective said alignment word only in the respective said message when transmitted at the starting state of a respective said connection.

15. The method according to claim 14, further comprising:

replacing respective said alignment word in respective messages following respective said initial messages, by a data field section immediately after the respective transmission postponement of a respective said subscriber terminal has been adjusted by said central unit.

16. The method according to claim 15, wherein:

said adjusting is performed by iterating.

17. An arrangement for determining transmission delays in a subscriber network, comprising:

a telephone exchange of a public switched telephone network;

a plurality of subscriber sets;

plurality of subscriber terminals;

each said subscriber terminal being connected to at least one said subscriber set by a respective wired transmission connection;

a central unit which is common to all of said subscriber terminals and connects said subscriber sets to said telephone exchange;

said subscriber network being arranged such that time-division data transmissions, when made between said subscriber terminals and said central unit, occur along a common transmission path;

said subscriber network being arranged for determining a respective value representing a respective transmission delay between said central unit and each respective said subscriber terminal;

said subscriber network being arranged such that transmission from respective ones of said subscriber terminals towards said central unit are synchronized in the respective subscriber terminals, with a frame structure of a respective signal to be transmitted from said central unit towards the respective subscriber terminal;

said subscriber network being arranged such that for determining each respective said transmission delay, a respective initial message indicating an offhook state is sent from the respective subscriber terminal towards said central unit for establishing a respective connection, in a respective message transmission time slot having a predetermined position in a transmission frame in a corresponding transmission direction; and said central unit being arranged to perform a determination of the respective value representing the respective transmission delay, from a respective said initial message sent by the respective subscriber terminal in a respective said message transmission time slot, by measuring the location of a respective received message in relation to said frame structure of the respective said signal transmitted from said central unit towards the respective said subscriber terminal.

18. An arrangement for determining transmission delays in a subscriber network, comprising:

a telephone exchange of a public switched telephone network;

a plurality of subscriber sets;

plurality of subscriber terminals;

each said subscriber terminal being connected to at least one said subscriber set by a respective wired transmission connection;

a central unit which is common to all of said subscriber terminals and connects said subscriber sets to said telephone exchange;

said subscriber network being arranged such that time-division data transmissions, when made between said subscriber terminals and said central unit, occur along a common land-line transmission path;

said subscriber network being arranged for determining a respective value representing a respective transmission delay between said central unit and each respective said subscriber terminal;

said subscriber network being arranged such that transmissions from respective ones of said subscriber terminals towards said central unit are synchronized in the respective subscriber terminals, with a frame structure of a respective signal to be transmitted from said central unit towards the respective subscriber terminal;

said subscriber network being arranged such that for determining each respective said transmission delay, a respective initial message indicating an off-hook state is sent from the respective subscriber terminal towards said central unit for establishing a respective connection, in a respective message transmission time slot having a predetermined position in a transmission frame in a corresponding transmission direction; and said central unit being arranged to perform a determination of the respective value representing the respective transmission delay, from a respective said initial message sent by the respective subscriber terminal in a respective said message transmission time slot, by measuring the location of a respective received message in relation to said frame structure of the respective said signal transmitted from said central unit towards the respective said subscriber terminal.

19. An arrangement for determining transmission delays in a wireless subscriber network, comprising:

a telephone exchange of a public switched telephone network;

a plurality of wireless subscriber sets;

plurality of wireless subscriber terminals;

each said subscriber terminal being connected to at least one said subscriber set by a respective wired transmission connection;

a central unit which is common to all of said wireless subscriber terminals and connects said subscriber sets to said telephone exchange;

said subscriber network being arranged such that time-division data transmissions, when made between said wireless subscriber terminals and said central unit, occur along a common wireless transmission path;

said subscriber network being arranged for determining a respective value representing a respective transmission delay between said central unit and each respective said wireless subscriber terminal;

said subscriber network being arranged such that transmissions from respective ones of said wireless subscriber terminals towards said central unit are synchronized in the respective wireless subscriber terminals, with a frame structure of a respective signal to be transmitted from said central unit towards the respective wireless subscriber terminal;

said subscriber network being arranged such that for determining each respective said transmission delay, a respective initial message indicating an off-hook state is sent from the respective subscriber terminal towards said central unit for establishing a respective connection, in a respective message transmission time slot having a predetermined position in a transmission frame in a corresponding transmission direction; and said central unit being arranged to perform a determination of the respective value representing the respective transmission delay, from a respective said initial message sent by the respective subscriber terminal in a respective said message transmission time slot, by measuring the location of a respective received message in relation to said frame structure of the respective said signal transmitted from said central unit towards the respective said subscriber terminal.

\* \* \* \* \*